United States Patent [19]

Belart

[11] Patent Number: 4,671,066
[45] Date of Patent: Jun. 9, 1987

[54] HYDRAULIC POWER BOOSTER

[75] Inventor: Juan Belart, Walldorf, Fed. Rep. of Germany

[73] Assignee: ITT Industries, Inc., New York, N.Y.

[21] Appl. No.: 604,733

[22] Filed: Apr. 27, 1984

[30] Foreign Application Priority Data

Apr. 29, 1983 [DE] Fed. Rep. of Germany ....... 3315730

[51] Int. Cl.⁴ .............................................. B60T 13/20
[52] U.S. Cl. ........................................ 60/551; 60/554; 60/562; 60/574
[58] Field of Search ...................... 60/547.1, 551, 574, 60/578, 548, 554, 562; 92/84

[56] References Cited

U.S. PATENT DOCUMENTS

| | | | |
|---|---|---|---|
| 3,889,467 | 6/1975 | Huffman | 60/548 |
| 3,978,667 | 9/1976 | Ohara | 60/547.2 |
| 4,287,813 | 9/1981 | Chatterjea | 60/554 |
| 4,366,745 | 1/1983 | Belart | 91/372 |
| 4,433,543 | 2/1984 | Thomas | 60/547.1 |
| 4,462,300 | 7/1984 | Belart | 60/547.1 |
| 4,468,927 | 9/1984 | Farr | 60/547.1 |
| 4,474,004 | 10/1984 | Thomas | 60/574 |
| 4,490,977 | 1/1985 | Fulmer | 60/547.1 |

FOREIGN PATENT DOCUMENTS 2248195  4/1973 Fed. Rep. of Germany .

Primary Examiner—Abraham Hershkovitz
Attorney, Agent, or Firm—James B. Raden; Donald J. Breh

[57] ABSTRACT

A hydraulic power booster, for the actuation of a master cylinder in an automotive vehicle brake system, in which a booster piston and a brake valve are essentially arranged in parallel with the booster piston. In dependence on the actuation force applied to the brake system, a hydraulic pressure may be developed in a booster chamber which is essentially defined by a pedal-operable piston rod and by the booster piston. In order to supply at least the required absorption volume to the brake actuating devices without considerable reaction force at the brake pedal, the piston rod may be supported at the booster housing, against an actuating force. The booster piston is positively connected with the piston rod so as to enable a limited relative displacement between the booster piston and the piston rod.

8 Claims, 1 Drawing Figure

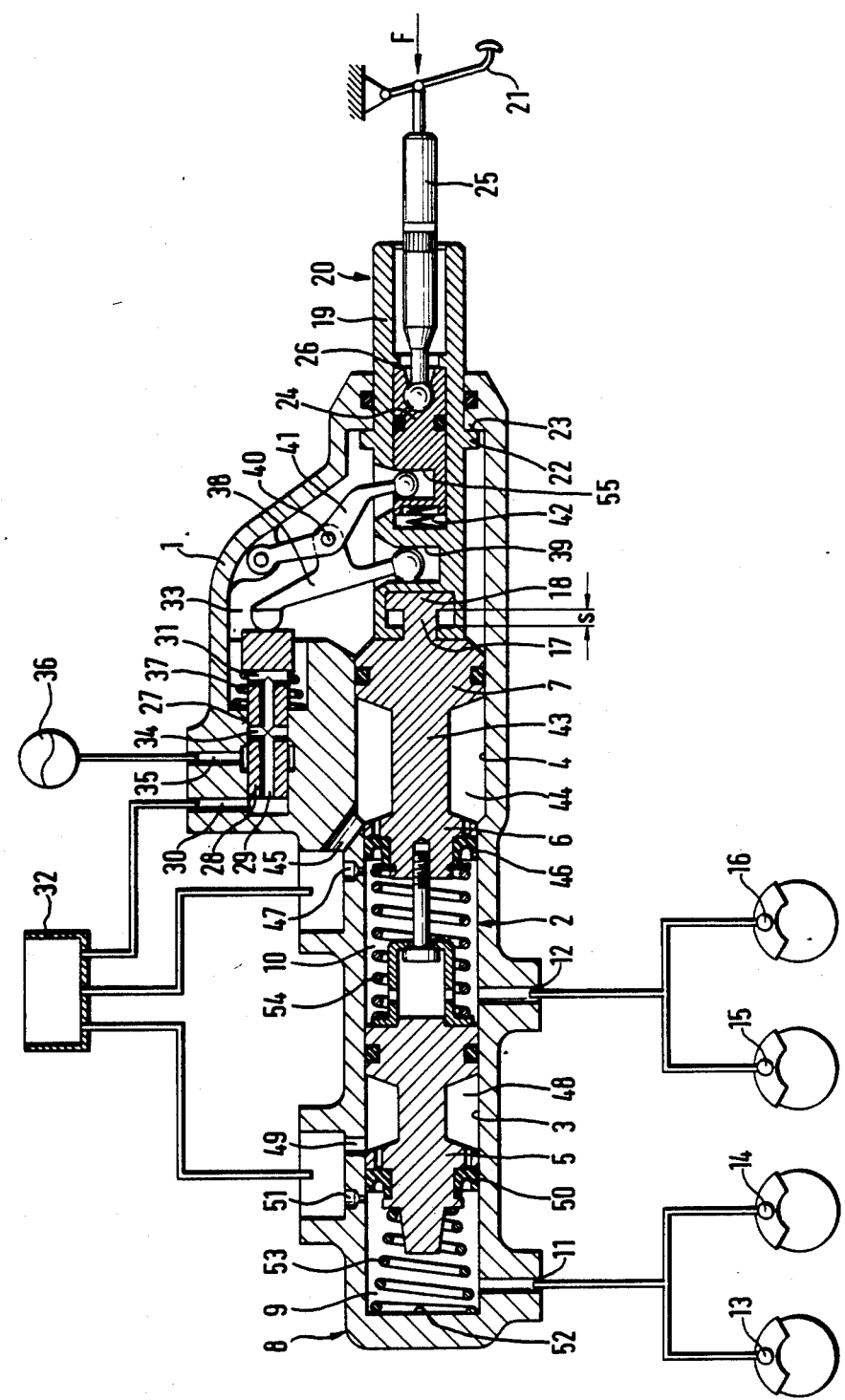

HYDRAULIC POWER BOOSTER

BACKGROUND OF THE INVENTION

This invention relates to a hydraulic power booster, in particular for the actuation of a master cylinder in an automotive vehicle brake system, with a booster piston. A brake valve which is essentially arranged in parallel with the booster piston and by means of which hydraulic pressure may be adapted to be metered into a booster chamber dependent on the actuating force applied to the brake valve, the booster chamber being defined by a pedal-operable piston rod and by the booster piston.

A brake device featuring the above characteristics is known from DE-OS (German Laid-open Print) No. 31 08 908.9. In the known brake booster, a master cylinder piston is arranged in a first cylinder bore, forming one component together with a booster piston. A web connects the master cylinder piston and the booster piston with each other. A pedal-side front face of the booster piston confines a booster chamber formed within the housing and is arranged coaxially relative to a pedal-operable piston rod. Hinged to the piston rod is a lever arrangement for the actuation of a brake valve. By exerting a force on the piston rod and by actuating the brake valve, pressure fluid may be metered into the booster chamber proportional to the actuating force to displace the booster piston and the master cylinder piston connected with the booster piston in the actuating direction of the brake booster. Thus, a corresponding pressure will be built up in the working chamber of the master cylinder. Connected to the working chamber of the master cylinder are wheel brakes that are pressurized in this way. A corresponding slowing-down of the vehicle will ensue after any initiation of any such brake actuating force.

Upon pressurization of the booster chamber, the piston rod connected with the brake pedal will likewise be pressurized. As a result, a corresponding reaction force will be felt at the pedal which will provide feed-back information to the driver of the vehicle with regard to the intensity of the braking action initiated by him. Under certain operating conditions, however, it may be desirable to have a certain volume of fluid supplied to the wheel brakes even before a noticeable reaction force is felt at the brake pedal.

SUMMARY OF THE INVENTION

It is therefore an object of the present invention to provide a hydraulic power booster of the type referred to, which will ensure that, even with a relatively small reaction force at the brake pedal, a correspondingly small braking pressure will be built up in the wheel brakes. In the initial phase of braking, an absorption volume is provided as required for the brake actuating devices connected to the master cylinder chambers.

According to the present invention, this object is accomplished in such a way that the piston rod may be supported at the booster housing, against an actuating force, with the booster piston positively connected with the piston rod to enable a limited relative movement between the booster piston and the piston rod. In such an embodiment, during the initial phase of the braking action, pressure medium will be metered and supplied from a pressure medium source into the booster chamber via the brake valve. Via the booster chamber, there will be a pressurization both of the piston rod connected with the brake valve, and of the booster piston. The pressurization will cause the piston rod connected with the brake pedal to temporarily support itself at the booster housing, with the booster piston being displaced in the actuating direction after having overcome effect of the friction seals. Thus, the master cylinder coupled with the booster piston will be pressurized and pressure fluid will be supplied to the wheel brakes connected to the master cylinder. With predeterminable pressure in the booster chamber of the hydraulic power booster, the booster piston will finally have moved such a distance relative to the piston rod that the play structurally provided between the booster piston and the piston rod will have been overcome. A further displacement of the booster piston will be possible only if the piston rod is simultaneously moving along. However, if during such a braking action, the entire effective surface of the piston rod is displaced in the direction of the booster chamber there will be a correspondingly high reaction force at the brake pedal, giving the driver of the vehicle a feel for the braking effect. The boosting factor of the described arrangement may easily and advantageously be set by changing the rating of the booster piston as compared with the master cylinder piston. The larger the diameter of the booster piston is rated, as compared with that of the master cylinder pistons, the smaller is the pressure that is needed in the booster chamber of the hydraulic power booster for the displacement of the master cylinder pistons.

An advantageous further feature of the invention resides in that the piston rod has a central piston and an annular piston which sealingly surrounds the central piston and which may be supported at the booster piston against a brake pedal actuating force. Thus the annular piston of the piston rod will be supported stationarily at the booster housing in the initial phase of braking, since there are but relatively small actuating forces at the brake pedal. At this stage, the brake actuation is caused exclusively by the central piston which is guided within the annular piston in a sealed manner and which may be designed with as small a diameter as may be desired. Thus in the initial phase of braking, correspondingly small reaction forces may be achieved at the brake pedal. An advantageous further feature of the invention resides in that the annular piston has an annular collar whereat the central piston may be supported in the brake's release direction. Thus, I ensure in a simple and advantageous manner that in any case the brake's release position will be established by the return springs bearing against the master cylinder piston. Besides, the central piston will be prevented from sliding out of the annular piston or out of the booster housing, respectively. It is further provided that the central piston of the piston rod is displaceable relative to the annular piston in the direction of actuation, against the force of a spring. This will ensure that upon the onset of the brake's actuation the central piston that will be displaced exclusively within the annular piston against the force of a compression spring correspondingly weak-rated. Thus, it will be the pressure prevailing in the booster piston that will almost exclusively exert a reaction force on the brake pedal.

A further feature of the invention comprises a device in which the brake valve may be actuated by the piston rod by means of a lever arrangement having two levers rotatably supported commonly, one of the levers being supported in a swinging manner in the housing and within the central piston, while the other lever supports itself at the brake valve as well as at the annular piston.

A still further feature of the invention calls for a booster piston which forms one component together with a master cylinder piston. In this arrangement, the booster piston is advantageously connected with the master cylinder piston by means of a transition piece, with the transition piece, together with the booster housing, the booster piston, and the master cylinder piston, forming an annular chamber permanently communicating with a supply reservoir. Thus, with the exception of the return springs arranged in the master cylinder, there will not be any essential resistance counteracting a displacement of the master cylinder piston and the booster piston respectively in the initial phase of braking.

In order to support the booster piston within the annular piston of the piston rod there is an extension formed at the pedal-side front face of the booster piston, the extension having a head provided with an enlarged diameter and engaging a recess of the annular piston with an axial play. The axial play between the booster piston and the annular piston is rated such as to guarantee that the volume displaced by the master cylinder, when travelling the play distance, will at least correspond to the absorption volume of the brake actuating device connected to the master cylinder. In this way, at least the absorption volume will be available for the brake actuating devices connected to the master cylinder before a noticeable reaction force will be felt at the brake pedal.

BRIEF DESCRIPTION OF THE DRAWING

One example of an embodiment of this invention will be explained in more detail hereinafter, reference being made to a sectional view shown in the representation.

DETAILED DESCRIPTION

In the representation, the reference numeral 1 marks a housing wherein a cylinder bore 2 is provided. The cylinder bore 2 leads to a bore section 3 of smaller diameter and to a bore section 4 of a larger diameter. In the smaller diameter bore section 3 two master cylinder pistons 5 and 6 are guided in a sealed manner. In the larger diameter bore section 4 a booster piston 7 is guided in a sealed manner, said booster piston 7 forming one component together with the master cylinder piston 6. Within the master cylinder 8 two master cylinder pistons 5 and 6 are guided in a sealed manner, each of the master cylinder pistons 5 and 6 confining a working chamber 9 and 10. Via housing ports 11 and 12, said working chambers 9 and 10 communicate with wheel brakes 13, 14, 15 and 16 of an automotive vehicle via corresponding pressure lines. On principle said wheel brakes may be arranged at the vehicle in any way that may seem suitable.

The pedal-side front face of the booster piston 7 has an extension 17 ending in a pedal-side enlarged head 18. The head 18 or the extension 17, respectively, is supported with an axial play "s" in an annular piston 19. Said annular piston 19 forms a part of a piston rod 20 connected with a brake pedal 21. The annular piston 19 leads to an annular collar 22 extending axially outwards and supporting itself at a shoulder 23 of the housing in the brake's release position as can be seen from the drawing.

A central piston 24 is guided and sealed within the annular piston 19 and is connected with a push rod 25 directly connected with the brake pedal 21. In the brake's release position as seen in the drawing, the right-hand end of the central piston 24 abuts at a shoulder 26 of the annular piston 19, to fix the brake release position of the power booster.

Further, a bore 27 is provided in the housing 1 of the described power booster. In the bore 27, a valve spool 28 of a brake valve is supported in an axially displaceable manner. The valve spool 28 has an essentially cylindrical design through which there is an axial bore 29 which in the brake release position establishes hydraulic communication between an unpressurized supply reservoir 32 and a radial bore 31 via a housing channel 30. Thus, in the brake release position of the hydraulic power booster, the radial bores 30 and 31 transmit atmospheric pressure to a booster chamber 33. Further, within the valve spool 28 axial channel 29 communicates with a radial channel 34 through which, upon a corresponding displacement of the valve spool, a housing channel 35 may communicate with the booster chamber. A pressure medium source 36 is connected to the channel 35 which in the brake release position is blocked by the piston spool 28. A compression spring 37 preloads the valve spool 28 in the brake release direction to maintain this condition.

As seen in the drawing, the end of a first lever 38 bears against the right-hand end of the valve spool 28, the other end of said lever 38 engaging a recess 39 of the annular piston 19. Via a common pivot 40, a second lever 41 is connected with the first lever 38. The second lever 41 is supported stationarily at its upper end within housing 1, as seen in the drawing. The lower end, as seen in the drawing engages a recess 55 of the central piston 24. The central piston 24 is axially displaceable relative to the annular piston 19 in the brake actuating direction with a compression spring 42 being fixed between the left end of the central piston 24, and a radial wall of annular piston 1, as seen in the drawing.

The booster piston 7 is rigidly and integrally connected with the master cylinder piston 6 by means of a web 43. Surrounding the web 43, an annular chamber 44 is formed which permanently communicates with the unpressurized supply reservoir 32 via a housing channel 45. The master cylinder piston 6 is sealed by a gasket 46 which in the illustrated brake release position allows communication between the working chamber 10, and the unpressurized reservoir 32, via an expansion port 47 arranged in the direction of actuation in front of the gasket. Once the brake is applied, the gasket 46 will interrupt the hydraulic communication between the unpressurized supply reservoir 32 and the working chamber 10. The master cylinder piston 5, together with the housing 1, likewise encloses an annular chamber 48 which permanently communicates with the unpressurized supply reservoir 32 via a housing channel 49. At the master cylinder piston 5, a gasket 50 is arranged which upon suitable displacement of the master cylinder piston 5 may seal an expansion port 51, thus allowing working chamber 9 of the master cylinder 8 to be pressurized. A first return spring 53 is fixed between the bottom wall 52 of the cylinder bore 2 and the end of the master cylinder piston 5. Likewise, a second return spring 54 is arranged between the two master cylinder pistons 5 and 6.

The mode of operation of the described brake system will now be explained in more detail, proceeding from the brake release condition in which all moving parts have adopted the positions shown in the drawing. The booster chamber 33 of the hydraulic power booster is communicating with the unpressurized supply reservoir 32 via the valve spool 28 and the housing channel 30. Thus neither the piston rod 20, nor the booster piston, is acted upon by a force and the wheel brakes 13, 14, 15 and 16 connected to the master cylinder 8 are under atmospheric pressure.

If an actuating force F is exerted on the brake pedal 21 the central piston 24 will be displaced against the force of the compression spring 42 and will move to the left in the drawing. The second lever 41 carries out a clockwise swinging movement around the stationary point of support in the housing. Due to the seals sealing the booster piston 7 and the master cylinder pistons 5 and 6 and due to the resistance applied by return springs 53 and 54 the lower end of the first lever 38, will at first be counteracted by a relatively strong resistance. Thus the upper end of the lever, as seen in the drawing, will move the valve spool 28 of the brake valve to the left. Thus, the valve spool 28 at first will close the housing channel 30 of the brake valve, thereby separating the booster chamber 33 from the unpressurized supply reservoir 32. Upon an increase of the force exerted on the brake pedal 21, the result of a continued displacement of the valve spool 28 will be that the housing channel 35 will overlap with the radial channel 34 of the valve spool 28. Thus pressure medium will flow from the pressure source 36 into the booster chamber 33 and will pressurize the central piston 24 with its relatively small effective surface, on the one hand, and will act on the booster piston 7, on the other hand. Thereby the booster piston 7 will be displaced within the cylinder bore 2 to the left in the drawing, carrying out a displacement relative to the annular piston 19. During this phase of the brake's actuation a relatively small reaction force will be felt at the brake pedal 21, said reaction force resulting from the pressure prevailing in the booster chamber 33 and from the effective surface of the central piston. In this analysis, the action of the compression spring 42 may be neglected as the rating of the compression spring 42 need be only strong enough to be able to overcome the friction of the seal between the central piston and the annular piston 19 in the brake's release phase.

Once a certain pressure level is established in the booster chamber 33 of the hydraulic power booster, the booster piston 7 will overcome the frictional effects of the system and will start moving with the master cylinder piston 6 in the direction of actuation. Thus, a hydraulic pressure will form in the working chamber 10 of the master cylinder 8. The hydraulic pressure will be supplied via respective pressure lines to the wheel brakes 15 and 16. Further, the pressure volume in the working chamber 10 of the master cylinder 8 will cause the master cylinder piston 5 to be displaced in the direction of actuation, to form a hydraulic pressure in the working chamber 9 of the master cylinder 8 to feed the wheel brakes 13 and 14. With a predeterminable second pressure, established in the booster chamber 33 of the hydraulic power booster, the booster piston 7 will have displaced itself relative to the annular piston 19 by the axial play "s" so that a further pressure increase in the working chambers 9 and 10 of the master cylinder 8 will be possible only if there is an increased reaction force at the brake pedal 21 since now the entire surface as defined by the diameter of the annular piston 19 is effective. The effect of an increase of the actuating force at the brake pedal 21 will therefore be to build up a pressure in the working chambers 9 and 10 of the master cylinder 8. This pressure will correspond to the pressure in the booster chamber 33 and will directly become effective at the wheel brakes 13, 14, 15 and 16 of the automotive vehicle.

Upon the release of the brake pedal force, the described actions will be reversed. First, the annular piston 19 will be displaced with the central piston 24 in the brake release direction. During this period, the head 18 formed at the booster piston 7 at first will remain in abutment with the left end of the annular piston 19. Upon a further pressure reduction in the booster chamber 33 of the hydraulic power booster, the annular collar 22 will restore to a position abutting the shoulder 23 of the housing 1. Thus the booster piston 7, due to the return springs 53 and 54, will travel the distance of the play "s" in the brake release direction until head 18 with its right front face will again abut against the annular piston 19, (the position shown by the drawing.)

Upon a failure of the pressure source 36, the working chambers 9 and 10 of the master cylinder 8 or the wheel brakes 13, 14, 15 and 16 connected to the working chambers 9 and 10 may be pressurized directly by a mechanical force acting on the brake pedal 21. The central piston 24 at first carries out a lost motion travel relative to the annular piston 19 until it abuts against the annular piston 19. Via the annular piston 19, the master cylinder piston 6 will be displaced mechanically in the direction of actuation. By this movement of master cylinder piston 6, the working chamber 10 is pressurized and, via the pressure volume established in the working chamber 10 of the master cylinder, working chamber 9 is also pressurized. Hence, it will be possible to apply the brake without any considerable pedal travel loss even upon a failure of the pressure source 36. The predetermined play between the booster piston 7 and the annular piston 19 will have no effect on the pedal travel in this action.

What is claimed is:

1. A hydraulic power booster for actuating a master cylinder in an automotive brake system comprising:
    a housing defining a bore and a booster chamber;
    a first master cylinder piston in said bore defining a first working chamber;
    a second master cylinder piston in said bore defining a second working chamber;
    a booster piston in said bore having an end at said booster chamber, said booster piston connected to said second master cylinder piston;
    brake valve means associated with said booster chamber for metering a pressurized fluid into said booster chamber as a function of an actuating force applied to a pedal-operated piston rod;
    an annular piston defining a first effective surface area mounted in said housing for slidable movement coaxial to said booster piston;
    stop means associated with said annular piston bearing against said housing in a released position of said piston rod;
    means associated with said booster piston and said annular piston providing for a limited independent axial movement of said booster piston relative to said annular piston over a predetermined amount of travel of said booster piston from said released position to an intermediate position of said piston rod, said predetermined amount of travel of said booster piston being an amount for displacing said first and said second master cylinder pistons a distance providing for delivery of a volume of brake fluid from said first and said second working chambers equal to a known absorption volume of said brake system;

said means providing for a limited independent movement adapted to interconnect said booster piston and said annular piston for simultaneous movement in excess of said predetermined amount of travel, said stop means being displaced away from said housing during said simultaneous movement and said first effective surface area being exposed to said pressurized fluid;

a central piston in said booster chamber defining a second effective surface area less than said first effective surface area, said central piston connected to said piston rod and mounted for slidable movement in said annular piston; and linkage means operatively connecting said central piston to said brake valve means.

2. A hydraulic power booster as claimed in claim 1, in which the booster piston has a diameter which is larger than the effective diameter of either of the first or the second master cylinder piston.

3. A hydraulic power booster as claimed in claim 1, in which said stop means is an annular collar on said annular piston which bears against said housing in a brake release direction.

4. A hydraulic power booster as claimed in claim 1 in which the central piston is displaceable by said piston rod relative to the annular piston in an actuating direction against the force of a spring.

5. A hydraulic power booster as claimed in claim 4, in which the brake valve is actuated in response to movement of the piston rod by means of a lever arrangement having two levers rotatably connected together at a common central pivot, one of the levers being pivotably supported at one end thereof to the housing and supported at a second end thereof to the central piston, the second lever supported at a valve spool of the brake valve and at the annular piston.

6. A hydraulic power booster as claimed in claim 1, in which the booster piston is formed as an integral component with a one of said master cylinder pistons.

7. A hydraulic power booster as claimed in claim 6, in which the booster piston is connected with the one master cylinder piston by means of an integral web and in that the web, together with the booster housing, the booster piston, and the one master cylinder piston, form an annular chamber in permanent communication with an unpressurized supply reservoir.

8. The power booster is defined in claim 1 wherein said means providing for independent movement of said booster piston includes an extension on the booster chamber end of said booster piston including an enlarged head portion received with axial clearance in a recess provided in an end of said annular piston, said clearance being equal to said predetermined amount of initial travel of said booster piston.

* * * * *